(12) United States Patent
Kim et al.

(10) Patent No.: US 8,570,710 B2
(45) Date of Patent: Oct. 29, 2013

(54) MULTILAYERED CERAMIC ELECTRONIC COMPONENT

(75) Inventors: Jong Han Kim, Gyunggi-do (KR); Hyun Chul Jeong, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 94 days.

(21) Appl. No.: 13/356,320

(22) Filed: Jan. 23, 2012

(65) Prior Publication Data

US 2013/0094118 A1 Apr. 18, 2013

(30) Foreign Application Priority Data

Oct. 18, 2011 (KR) .................. 10-2011-0106315

(51) Int. Cl.
*H01G 4/06* (2006.01)

(52) U.S. Cl.
USPC .............. 361/321.2; 361/321.1; 361/301.4; 361/303; 361/306.1; 361/306.3

(58) Field of Classification Search
USPC ............... 361/321.2, 321.1, 301.4, 310.2, 361/303–305, 311–313, 306.1, 306.3, 309
See application file for complete search history.

(56) References Cited

U.S. PATENT DOCUMENTS

| | | | |
|---|---|---|---|
| 6,362,947 B1* | 3/2002 | Chazono | 361/306.3 |
| 7,161,089 B2* | 1/2007 | Sasaki et al. | 174/262 |
| 7,466,538 B2 | 12/2008 | Sakamoto et al. | |
| 7,725,172 B2* | 5/2010 | Rouw et al. | 600/516 |
| 8,373,964 B2* | 2/2013 | Ahn et al. | 361/301.4 |
| 8,456,799 B2* | 6/2013 | Chang et al. | 361/321.2 |
| 2006/0256540 A1* | 11/2006 | AbuGhazaleh et al. | 361/788 |
| 2008/0212257 A1 | 9/2008 | Sakamoto et al. | |

FOREIGN PATENT DOCUMENTS

| | | |
|---|---|---|
| JP | 10-012476 A | 1/1998 |
| JP | 11-031633 A | 2/1999 |
| JP | 2006-332334 A | 12/2006 |

* cited by examiner

*Primary Examiner* — Nguyen T Ha (74) *Attorney, Agent, or Firm* — McDermott Will & Emery LLP (57) ABSTRACT

There is provided multilayered ceramic electronic component having a 0603 size or less, the multilayered ceramic electronic component including: a ceramic body including a plurality of internal electrodes and dielectric layers disposed between the internal electrodes; and external electrodes disposed on outer surfaces of the ceramic body and electrically connected to the internal electrodes, wherein when a region in which the internal electrodes are overlapped is defined as an active region in a cross section of a central portion in a length direction of the ceramic body, taken in width and thickness directions thereof, the entire area of the cross section taken in the width and thickness directions is defined as At, and an area of the active region is defined as Aa, the following equation is satisfied: $65\% \leq Aa/At \leq 90\%$.

29 Claims, 4 Drawing Sheets

MULTILAYERED CERAMIC ELECTRONIC COMPONENT

CROSS-REFERENCE TO RELATED APPLICATIONS

This application claims the priority of Korean Patent Application No. 10-2011-0106315 filed on Oct. 18, 2011, in the Korean Intellectual Property Office, the disclosure of which is incorporated herein by reference.

BACKGROUND OF THE INVENTION

1. Field of the Invention

The present invention relates to a multilayered ceramic electronic component.

2. Description of the Related Art

A multilayered ceramic capacitor, a multilayered ceramic electronic component, includes internal electrodes formed between a plurality of dielectric layers.

As electronic products are miniaturized and multi-functionalized, demand for the miniaturization and an increase in the capacitance of a chip type multilayered capacitor embedded in the electronic products has increased.

In order to miniaturize the multilayered ceramic capacitor and increase the capacitance thereof, a method of reducing a thickness of a dielectric layer interposed between the internal electrodes in a ceramic body or increasing the amount of multilayered internal electrodes is used.

With the use of this method of miniaturizing the multilayered ceramic capacitor and increasing the capacitance thereof, formation density of the internal electrodes is increased in an active region occupied by the internal electrodes in the multilayered ceramic capacitor.

When the formation density of the internal electrodes in the active region is increased, internal defects such as cracking may be caused at an interface between the dielectric layer and the internal electrode layer after only a small change in internal stress, caused by an operation such as the cutting or sintering of a ceramic green sheet.

In a case in which internal defects such as cracking is generated at the interface between the dielectric layer and the internal electrode layer, desired characteristics such as capacitance securing may not be obtained and reliability of the multilayered ceramic electronic component, such as the multilayered ceramic capacitor, may be deteriorated.

SUMMARY OF THE INVENTION

An aspect of the present invention provides a multilayered ceramic electronic component having reduced internal defects and improved characteristics by alleviating internal stress even in a case in which the multilayered ceramic electronic component is miniaturized and the capacitance thereof is increased.

According to an aspect of the present invention, there is provided a multilayered ceramic electronic component having a 0603 size or less, the multilayered ceramic electronic component including: a ceramic body including a plurality of internal electrodes and dielectric layers disposed between the internal electrodes; and external electrodes disposed on outer surfaces of the ceramic body and electrically connected to the internal electrodes, wherein when a region in which the internal electrodes are overlapped is defined as an active region in a cross section of a central portion in a length direction of the ceramic body, taken in width and thickness directions thereof, the entire area of the cross section taken in the width and thickness directions is defined as At, and an area of the active region is defined as Aa, the following equation is satisfied: $65\% \leq Aa/At \leq 90\%$, and when the active region is divided into nine regions, ①, ②, ③, ④, ⑤, ⑥, ⑦, ⑧, and ⑨, by being trisected in each of the width and thickness directions, continuity of the internal electrodes in region ② in an upper portion in the thickness direction and an intermediate portion in the width direction or continuity of the internal electrodes in region ⑧ in a lower portion in the thickness direction and an intermediate portion in the width direction is greater than those of the internal electrodes in regions, except for the region in an upper portion in the thickness direction and an intermediate portion in the width direction and the region in a lower portion in the thickness direction and an intermediate portion in the width direction.

The continuity of the internal electrodes in the region ② in an upper portion in the thickness direction and an intermediate portion in the width direction or the continuity of the internal electrodes in the region ⑧ in a lower portion in the thickness direction and an intermediate portion in the width direction may be 85% or more.

The continuities of the internal electrodes in the region ② in an upper portion in the thickness direction and an intermediate portion in the width direction and the region ⑧ in a lower portion in the thickness direction and an intermediate portion in the width direction may be greater than those of the internal electrodes in the regions ①, ③, ④, ⑤, ⑥, ⑦, and ⑨, except for the region in an upper portion in the thickness direction and an intermediate portion in the width direction and the region in a lower portion in the thickness direction and an intermediate portion in the width direction.

In the active region, continuity of the internal electrodes in region ⑤ in an intermediate portion in the thickness direction and an intermediate portion in the width direction may be lowest.

The continuity of the internal electrodes in the region ⑤ in an intermediate portion in the thickness direction and an intermediate portion in the width direction may be 80% or more.

An absolute value difference between the continuity of the internal electrodes in the region ② in an upper portion in the thickness direction and an intermediate portion in the width direction or the continuity of the internal electrodes in the region ⑧ in a lower portion in the thickness direction and an intermediate portion in the width direction and the continuity of the internal electrodes in region ⑤ in an intermediate portion in the thickness direction and an intermediate portion in the width direction may be 3% or more.

A margin portion of the taken cross section may have a width of 50 μm or less.

The internal electrodes may be laminated in an amount of 200 layers or more.

A length, a width, and a thickness of the ceramic body may have ranges of 0.6±0.15 mm, 0.3±0.15 mm, and 0.3±0.15 mm, respectively, or have ranges of 0.4±0.10 mm, 0.2±0.10 mm, and 0.2±0.10 mm, respectively.

According to another aspect of the present invention, there is provided a multilayered ceramic electronic component including: a ceramic body including a dielectric layer and internal electrodes; an active region having the internal electrodes overlapped in a cross section taken in width and thickness directions of the ceramic body to contribute to a formation of capacitance; and a margin portion defining an outer portion of the active region, wherein when the active region is divided into nine regions, ①, ②, ③, ④, ⑤, ⑥, ⑦, ⑧, and ⑨, by being trisected in each of the width and thickness directions, continuity of the internal electrodes in region ② in an upper portion in the thickness direction and an intermediate portion in the width direction or continuity of the internal electrodes in region ⑧ in a lower portion in the thickness direction and an intermediate portion in the width direction is greater than those of the internal electrodes in regions, except for the region in an upper portion in the thickness direction and an intermediate portion in the width direction and the region in a lower portion in the thickness direction and an intermediate portion in the width direction.

The continuity of the internal electrodes in the region ② in an upper portion in the thickness direction and an intermediate portion in the width direction or the continuity of the internal electrodes in the region ⑧ in a lower portion in the thickness direction and an intermediate portion in the width direction may be 85% or more.

In the active region, continuity of the internal electrodes in region ⑤ in an intermediate portion in the thickness direction and an intermediate portion in the width direction may be lowest.

The continuity of the internal electrodes in the region ⑤ in an intermediate portion in the thickness direction and an intermediate portion in the width direction may be 80% or more.

An absolute value difference between the continuity of the internal electrodes in the region ② in an upper portion in the thickness direction and an intermediate portion in the width direction or the continuity of the internal electrodes in the region ⑧ in a lower portion in the thickness direction and an intermediate portion in the width direction and the continuity of the internal electrodes in region ⑤ in an intermediate portion in the thickness direction and an intermediate portion in the width direction may be 3% or more.

A ratio of the active region to the entire area of the taken cross section may be 65 to 90%, and the multilayered ceramic electronic component may be a 0603-size or smaller multilayered ceramic electronic component.

The margin portion may have a width of 50 μm or less.

A length, a width, and a thickness of the ceramic body may have ranges of 0.6±0.15 mm, 0.3±0.15 mm, and 0.3±0.15 mm, respectively, or have ranges of 0.4±0.10 mm, 0.2±0.10 mm, and 0.2±0.10 mm, respectively.

The internal electrodes may be laminated in an amount of 200 layers or more.

According to another aspect of the present invention, there is provided a multilayered ceramic electronic component having a 0603 size or less, the multilayered ceramic electronic component including: a ceramic body including a plurality of internal electrodes and dielectric layers disposed between the internal electrodes; and external electrodes disposed on outer surfaces of the ceramic body and electrically connected to the internal electrodes, wherein when a region in which the internal electrodes are overlapped is defined as an active region in a cross section of a central portion in a length direction of the ceramic body, taken in width and thickness directions thereof, the entire area of the cross section taken in the width and thickness directions is defined as At, and an area of the active region is defined as Aa, the following equation is satisfied: 65%≤Aa/At≤90%, and when the active region is divided into nine regions, ①, ②, ③, ④, ⑤, ⑥, ⑦, ⑧, and ⑨, by being trisected in each of the width and thickness directions, continuity of the internal electrodes in region ② in an upper portion in the thickness direction and an intermediate portion in the width direction or continuity of the internal electrodes in region ⑧ in a lower portion in the thickness direction and an intermediate portion in the width direction is greater than that of the internal electrodes in region ⑤ in an intermediate portion in the thickness direction and an intermediate portion in the width direction.

The continuity of the internal electrodes in the region ② in an upper portion in the thickness direction and an intermediate portion in the width direction or the continuity of the internal electrodes in the region ⑧ in a lower portion in the thickness direction and an intermediate portion in the width direction may be 85% or more.

The continuity of the internal electrodes in the region ⑤ in an intermediate portion in the thickness direction and an intermediate portion in the width direction may be 80% or more.

The continuities of the internal electrodes in the region ② in an upper portion in the thickness direction and an intermediate portion in the width direction and the region ⑧ in a lower portion in the thickness direction and an intermediate portion in the width direction may be greater than that of the internal electrodes in the region ⑤ in an intermediate portion in the thickness direction and an intermediate portion in the width direction.

An absolute value difference between the continuity of the internal electrodes in the region ② in an upper portion in the thickness direction and an intermediate portion in the width direction or the continuity of the internal electrodes in the region ⑧ in a lower portion in the thickness direction and an intermediate portion in the width direction and the continuity of the internal electrodes in the region ⑤ in an intermediate portion in the thickness direction and an intermediate portion in the width direction may be 3% or more.

The continuity of the internal electrodes in the region ② in an upper portion in the thickness direction and an intermediate portion in the width direction or the region ⑤ in a lower portion in the thickness direction and an intermediate portion in the width direction may be greater than those of the internal electrodes in regions ①, ③, ④, ⑥, ⑦, and ⑨, except for the region ② in an upper portion in the thickness direction and an intermediate portion in the width direction, the region ⑧ in a lower portion in the thickness direction and an intermediate portion in the width direction, and the region ⑤ in an intermediate portion in the thickness direction and an intermediate portion in the width direction.

Continuities of the internal electrodes in regions ①, ③, ④, ⑥, ⑦, and ⑨, except for the region ② in an upper portion in the thickness direction and an intermediate portion in the width direction, the region ⑧ in a lower portion in the thickness direction and an intermediate portion in the width direction, and the region ⑤ in an intermediate portion in the thickness direction and an intermediate portion in the width direction, may be greater than that of the internal electrodes in the region ⑤ in an intermediate portion in the thickness direction and an intermediate portion in the width direction.

In the active region, the continuity of the internal electrodes in the region ⑤ in an intermediate portion in the thickness direction and an intermediate portion in the width direction may be lowest.

A margin portion of the taken cross section may have a width of 50 μm or less.

A length, a width, and a thickness of the ceramic body may have ranges of 0.6±0.15 mm, 0.3±0.15 mm, and 0.3±0.15 mm, respectively, or have ranges of 0.4±0.10 mm, 0.2±0.10 mm, and 0.2±0.10 mm, respectively.

The internal electrodes may be laminated in an amount of 200 layers or more.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will now be described in detail with reference to the accompanying drawings. However, it should be noted that the spirit of the present invention is not limited to the embodiments set forth herein, and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, like reference numerals will be used to designate like components having similar functions throughout the drawings within the scope of the present invention.

A multilayered ceramic electronic component according to an embodiment of the present invention may be appropriately used in a multilayered ceramic capacitor, a multilayered varistor, a thermistor, a piezoelectric element, a multilayer substrate, or the like, having a structure in which a dielectric layer corresponding to a ceramic layer is used, and internal electrodes face each other, having the dielectric layer therebetween.

Figure 1:
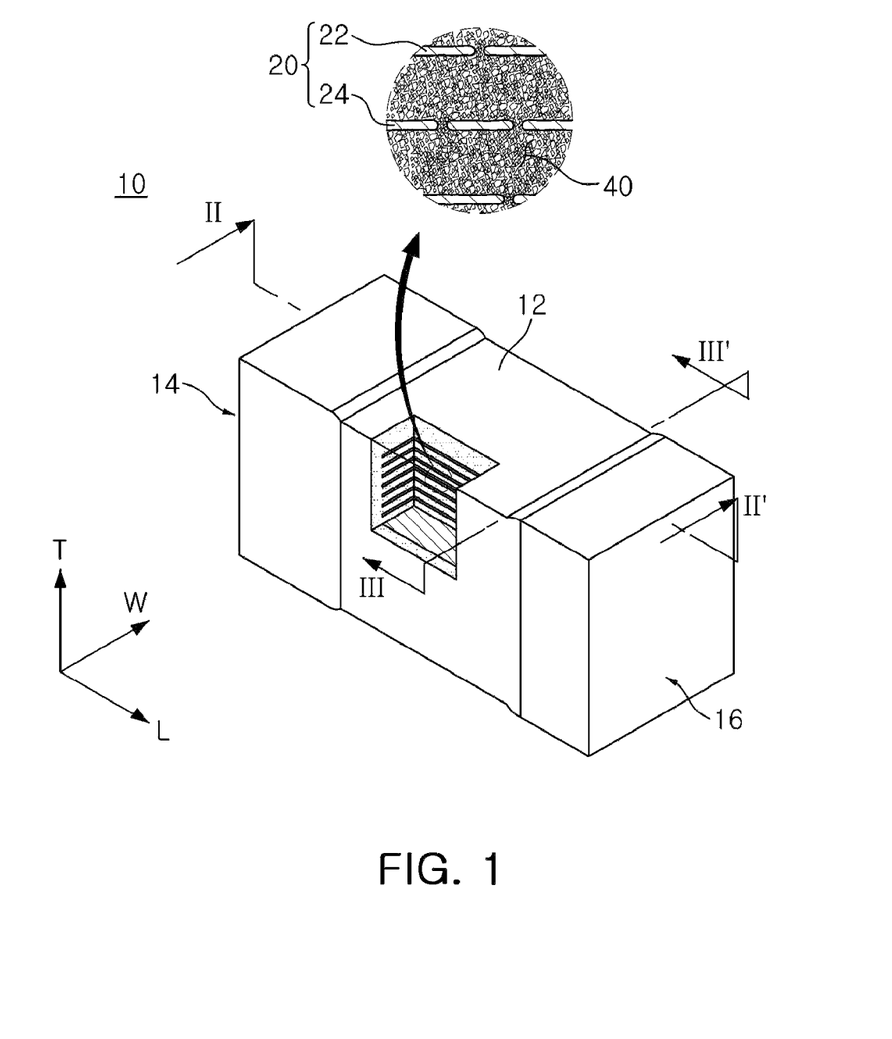
FIG. 1 is a schematic partially cut-away perspective view of a multilayered ceramic capacitor according to an embodiment of the present invention.
Figure 2:
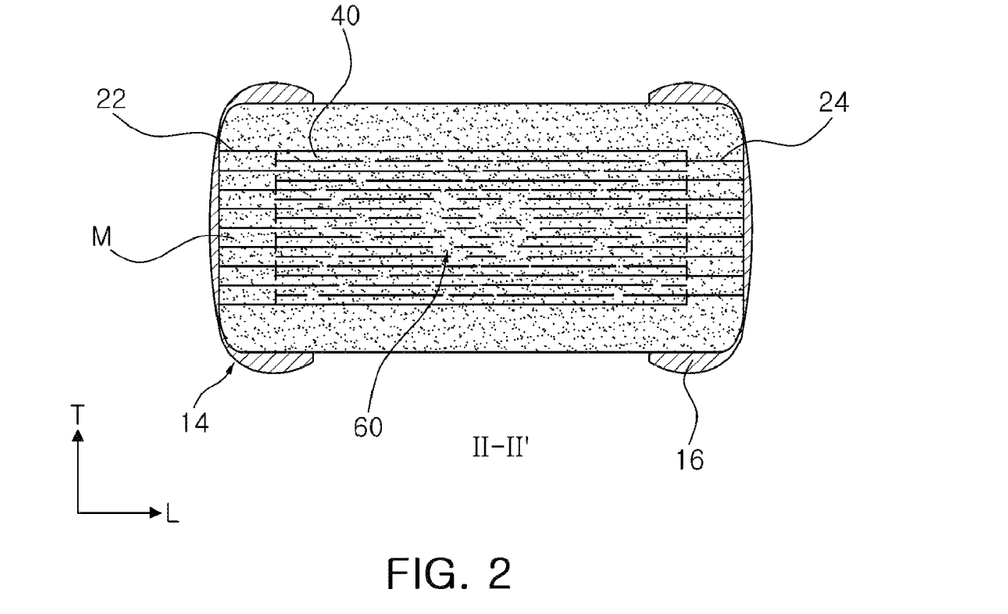
FIG. 2 is a schematic cross-sectional view taken along line II-II' of FIG. 1.

Hereinafter, a multilayered ceramic capacitor according to an embodiment of the present invention will be described.
Multilayered Ceramic Capacitor FIG. 1 is a schematic partially cut-away perspective view of a multilayered ceramic capacitor according to an embodiment of the present invention; FIG. 2 is a schematic cross-sectional view taken along line II-II' of FIG. 1; and FIG. 3 is a schematic cross-sectional view taken along line III-III' of FIG. 1.

Figure 3:
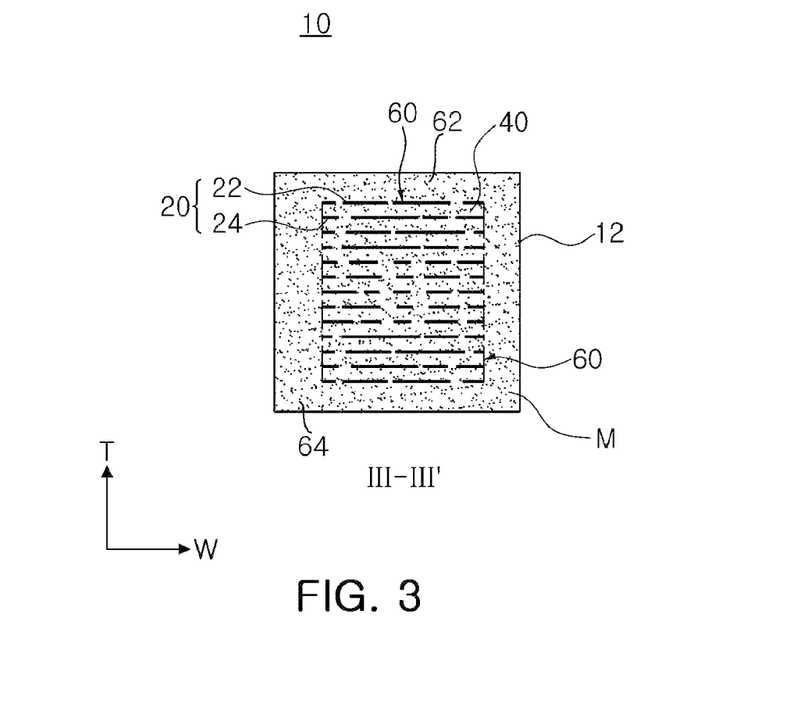
FIG. 3 is a schematic cross-sectional view taken along line III-III' of FIG. 1.

Referring to FIGS. 1 through 3, a multilayered ceramic capacitor 10 may include a ceramic body 12, an active region 60, and a margin portion M.

The ceramic body 12 may be manufactured by applying a conductive paste so as to form internal electrodes 20 on ceramic green sheets and laminating and sintering the ceramic green sheets on which the internal electrodes 20 are formed. The ceramic body 12 may be formed by repeatedly laminating a plurality of dielectric layers 40 and internal electrodes 20.

The ceramic body 12 may have a hexahedral shape. The ceramic body 12 may not have a perfectly hexahedral shape with entirely straight lines due to sintering shrinkage of ceramic powder when the ceramic powder is sintered to have a chip shape. That is, the ceramic body 12 may have a substantially hexahedral shape.

A direction of the hexahedron will be defined in order to clearly describe the embodiment of the present invention. L, W and T shown in FIG. 1 refer to a length direction, a width direction, and a thickness direction, respectively. Here, the thickness direction T may have the same meaning as a lamination direction of the internal electrodes. According to the embodiment of the present invention, the length direction L refers to a direction in which the internal electrodes 20 are extended toward external electrodes 14 and 16, electrically connected thereto. The present invention may be applied to a multilayered ceramic electronic component having a distance greater in the length direction L than in the width direction W, or a multilayered ceramic electronic component having a distance in the length direction L smaller than a distance in the width direction W. In addition, unlike the embodiment shown in FIG. 1, the present invention may also be applied to a multilayered ceramic electronic component in which a plurality of external electrodes are disposed on a single outer surface of a ceramic body.

FIG. 1 illustrates the multilayered ceramic capacitor 10 in the form of a chip and having a rectangular parallelepiped shape in which a distance in the length direction L is greater than that in the width direction W or in the thickness direction T.

The dielectric layers 40 and the internal electrodes 20 may be observed from a cross section (hereinafter referred to as an 'L-T cross-section') of the sintered ceramic body 12 taken in length and thickness (L-T) directions, as shown in FIG. 2 and a cross section (hereinafter referred to as a 'W-T cross-section') of the ceramic body 12 taken in width and thickness (W-T) directions, as shown in FIG. 3.

As a material forming the dielectric layers 40, ceramic powder having high permittivity may be used in order to increase capacitance. The ceramic powder may be, for example, a barium titanate ($BaTiO_3$) based power, a strontium titanate ($SrTiO_3$) based power, or the like, but is not limited thereto.

The internal electrodes 20 may include a first internal electrode 22 and a second internal electrode 24, and the first and second internal electrodes 22 and 24 may be electrically connected to first and second external electrodes 14 and 16, respectively.

The first and second external electrodes 14 and 16 may be formed of a conductive paste containing metal powder. The metal powder contained in the conductive paste may be copper (Cu), nickel (Ni), or an alloy thereof, but is not particularly limited thereto.

Here, the first and second internal electrodes 22 and may be alternately laminated repeatedly, having the respective dielectric layers 40 therebetween. In the L-T cross section of FIG. 2 and the W-T cross section of FIG. 3, the entire portion in which the first and second internal electrodes 22 and 24 are overlapped with each other, having the respective dielectric layers 40 therebetween, is defined as the active region 60. In addition, a portion between the active region 60 and an outer surface of the ceramic body 12 is defined as the margin portion M. Particularly, in the margin portion M, upper and lower margin portions disposed on and under the active region 60 may be defined as upper and lower cover layers 62 and 64.

The plurality of dielectric layers 40 configuring the ceramic body 12 may be in a sintered state. The dielectric layers 40 adjacent to each other may be integrated, such that it may be difficult to discern a boundary therebetween without using a scanning electron microscope (SEM).

FIGS. 2 and 3 show cross sections of the ceramic body 12 taken along a central portion of the ceramic body 12 in the width direction W and a central portion thereof in the length direction L, respectively.

The central portion of the ceramic body 12 in the width direction W or the length direction L may be defined as a point at which a distance from a central point of the ceramic body 12 in the width direction W or the length direction L is in a range of 15% of the width or the length of the ceramic body 12.

Meanwhile, in order to miniaturize the multilayered ceramic capacitor 10, the multilayered ceramic capacitor 10 according to the embodiment of the present invention may have a standard 0603 size or less, such as a component having a length and a width of the ceramic body 12 that are 0.6±0.15 mm and 0.3±0.15 mm, respectively, (a 0603-size component) or a component having a length and a width of the ceramic body 12 that are 0.4±0.10 mm and 0.2±0.10 mm, respectively (a 0402-size component).

In addition, in order to increase capacitance of the multilayered ceramic capacitor (for example, in order to allow the 0603-size multilayered ceramic capacitor to have 1 μF or more), two hundred or more internal electrodes 20 may be laminated in the ceramic body 12. In addition, the margin portion M may be set to have a width of 50 μm or less.

As described below, according to the present invention, electrode continuities of the internal electrodes 20 forming the active region 60 are different for each detailed region of the active region 60, whereby characteristics of the multilayered ceramic electronic component may be improved.

Figure 4:
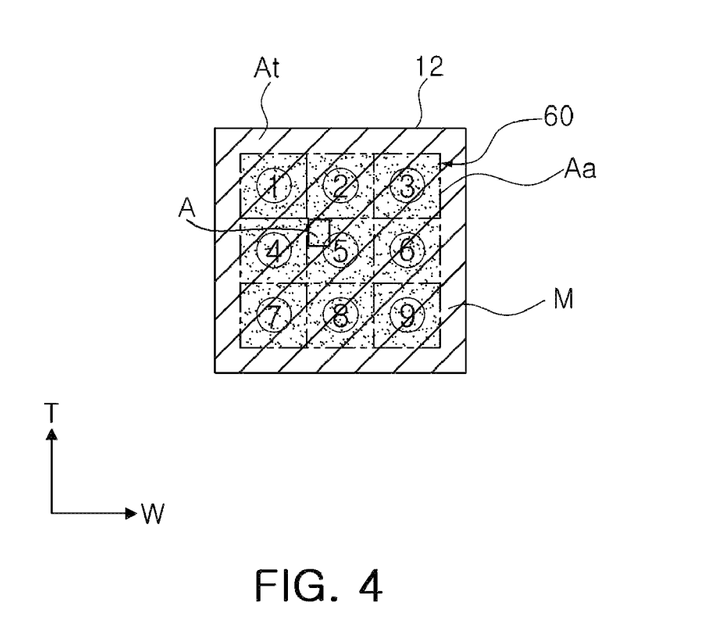
FIG. 4 is a schematic view showing a uniformly divided active region of the cross section of FIG. 3.
Figure 5:
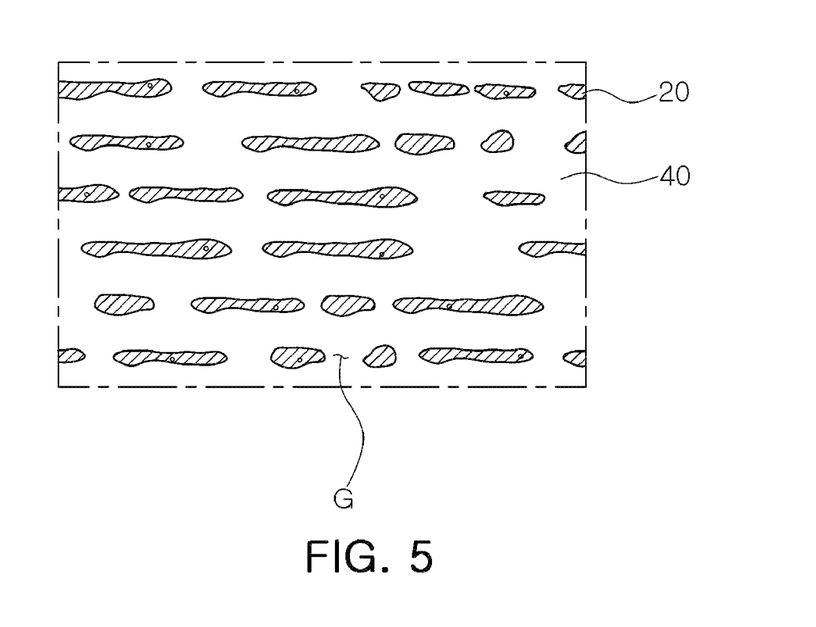
FIG. 5 is a schematic view showing a photographed image of part A of FIG. 4.

FIG. 4 is a schematic view showing a uniformly divided active region of the cross section of FIG. 3; FIG. 5 is a schematic view showing a photographed image of part A of FIG. 4; and FIG. 6 is a schematic view describing a method of measuring continuity of an internal electrode according to the embodiment of the present invention.

Figure 6:
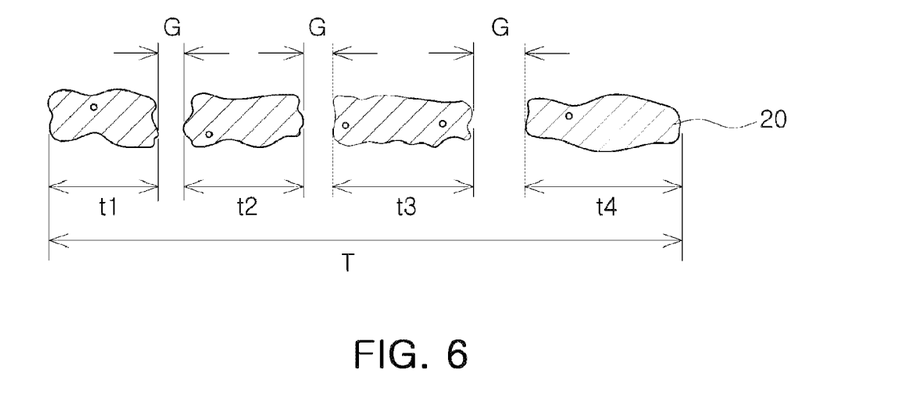
FIG. 6 is a schematic view describing a method of measuring continuity of an internal electrode according to the embodiment of the present invention.

Referring to FIGS. 4 through 6, in a case in which the active region 60 of the W-T cross section of the ceramic body 12 in the multilayered ceramic capacitor 10 according to the embodiment of the present invention is trisected in each of the width direction W and the thickness direction T of the ceramic body 12 to be uniformly divided into nine regions, each region may be defined as a region ① in an upper portion in the thickness direction T and a left portion in the width direction W, a region ② in an upper portion in the thickness direction T and an intermediate portion in the width direction W, a region ③ in an upper portion in the thickness direction T and a right portion in the width direction W, a region ④ in an intermediate portion in the thickness direction T and a left portion in the width direction W, a region ⑤ in an intermediate portion in the thickness direction T and an intermediate portion in the width direction W, a region ⑥ in an intermediate portion in the thickness direction T and a right portion in the width direction W, a region ⑦ in a lower portion in the thickness direction T and a left portion in the width direction W, a region ⑧ in a lower portion in the thickness direction T and an intermediate portion in the width direction W, and a region ⑨ in a lower portion in the thickness direction T and a right portion in the width direction W.

In this case, according to the embodiment of the present invention, the continuity of the internal electrodes 20 in the region ② in an upper portion in the thickness direction T and an intermediate portion in the width direction W or the continuity of the internal electrodes 20 in the region ⑧ in a lower portion in the thickness direction T and an intermediate portion in the width direction W is greater than those of the internal electrodes 20 in the remaining regions ①, ③, ④, ⑤, ⑥, ⑦, and ⑨. According to another embodiment of the present invention, the continuity of the internal electrodes 20 in the region ② in an upper portion in the thickness direction T and an intermediate portion in the width direction W and the continuity of the internal electrodes 20 in the region ⑧ in a lower portion in the thickness direction T and an intermediate portion in the width direction W may be greater than those of the internal electrodes 20 in remaining regions ①, ③, ④, ⑤, ⑥, ⑦, and ⑨.

In addition, according to another embodiment of the present invention, the continuity of the internal electrodes 20 in the region ② in an upper portion in the thickness direction and an intermediate portion in the width direction or the continuity of the internal electrodes 20 in the region ⑧ in a lower portion in the thickness direction and an intermediate portion in the width direction may be greater than that of the internal electrodes 20 in the region ⑤ in an intermediate portion in the thickness direction and an intermediate portion in the width direction.

The continuity of the internal electrodes 20 in the W-T cross section refers to a degree to which the internal electrodes 20 are continuously formed in the width direction W. The less discontinuous portions of the internal electrodes 20 there are, the greater the continuity of the internal electrodes 20.

Referring to FIG. 6, the continuity of the internal electrodes 20 defines how continuously the internal electrodes 20 are formed with the exception of gaps G formed between the internal electrodes 20, which are discontinuous portions of the internal electrodes 20.

The gaps G refer to penetrated portions of the internal electrodes 20, and are only formed in partial surfaces of the internal electrodes 20 or in inner portions thereof, such that the gaps G may penetrate through the internal electrodes 20 but do not include pores. The gaps G may be filled by the dielectric layers 40.

Particularly, the continuity of the internal electrodes in one (hereinafter, referred to as a "specific region") of nine regions, ①, ②, ③, ④, ⑤, ⑥, ⑦, ⑧, and ⑨, of the active region 60 refers how continuously the internal electrodes are formed in the specific region.

According to the embodiment of the present invention, the continuity of the internal electrodes in the specific region may be measured from an image (See FIG. 5) captured from a portion of the specific region.

For example, in order to measure the continuity of the internal electrodes in the specific region (for example, the region ② in an upper portion in the thickness direction and a intermediate portion in the width direction), an image of the internal electrodes 20 in a portion of the specific region is captured using a scanning electron microscope (SEM) or an optical microscope, in the cross section taken in the width and thickness (W-T) directions in the central portion of the ceramic body in the length direction, as shown in FIG. 5.

FIG. 5 is a view showing an image captured from a portion of the specific region in detail. Referring to FIG. 5, the continuity of the internal electrodes 20 facing each other, having the respective dielectric layers 40 therebetween in a portion of the specific region may be measured from the gaps G which make the internal electrodes 20 to be discontinuous.

FIG. 6 is a schematic view describing a method of measuring continuity of an internal electrode according to the embodiment of the present invention.

Referring to FIG. 6, when it is defined that the entire length of each internal electrode including the gaps G is T and lengths of actually formed internal electrode portions are t1, t2, t3, . . . , tn, in the image of the internal electrodes 20 captured as shown in FIG. 5, an actual length (t1+t2+t3+ . . . +tn) of each internal electrode may be measured as a value obtained by subtracting lengths of the gaps G from the entire length T of each internal electrode in the captured image of the internal electrodes 20. Here, the continuity of the internal electrode in the specific region may be represented by (t1+t2+t3+ . . . +tn)/T. Although FIG. 6 shows only four actually formed internal electrode portions t1, t2, t3, and t4 in a signal internal electrode, the number of actually formed internal electrode portions is not particularly limited.

The continuity of the internal electrodes in the specific region (for example, the region ② in an upper portion in the thickness direction and an intermediate portion in the width direction) may also be calculated as an average of the continuities of the respective internal electrodes measured from a plurality of images scanned at a plurality of points in the specific region.

For example, the continuities of the respective internal electrodes may be measured from five images arbitrarily captured in the specific region as described with reference to FIGS. 5 and 6, and an average of the continuities of the internal electrodes, each measured from the five images, may be regarded as the continuity of the internal electrode in the specific region.

The continuity of the internal electrode 20 may be calculated by analyzing a high magnification image such as that of FIG. 5 using a computer program such as SigmaScan Pro, or the like.

The gap G may be generated due to a phenomenon in which the internal electrodes 20 are lumped and disconnected when the internal electrodes 20 are sintered. Describing the reason for which the internal electrodes 20 are disconnected in detail, since sintering shrinkage behavior of the internal electrodes 20 and sintering shrinkage behavior of the dielectric layers 40 formed of a ceramic are different at the time of a sintering process, when a difference in a sintering shrinkage initiation temperature therebetween is large, the disconnection of the internal electrodes 20 may be generated.

Generation ratios of the gaps G, that is, the continuities of the internal electrodes 20 are different in the nine uniform regions ①, ②, ③, ④, ⑤, ⑥, ⑦, ⑧, and ⑨, whereby the generation of interface cracks between the internal electrode 20 and the dielectric layers 40 may be prevented.

In a case in which the continuities of the internal electrodes 20 are uniform in the nine uniform regions ①, ②, ③, ④, ⑤, ⑥, ⑦, ⑧, and ⑨ based on the W-T cross, or in a case in which the continuities of the internal electrodes 20 in the region ② in an upper portion in the thickness direction and an intermediate portion in the width direction, the region ⑧ in a lower portion in the thickness direction and an intermediate portion in the width direction, or the region ② in an upper portion in the thickness direction and an intermediate portion in the width direction and the region ⑧ in a lower portion in the thickness direction and an intermediate portion in the width direction are smaller than that of the internal electrodes 20 in the region ⑤ in an intermediate portion in the thickness direction and an intermediate portion in the width direction, the possibility of generating interface cracks in the multilayered ceramic capacitor is higher and it is difficult to determine performance of the multilayered ceramic capacitor after the mounting thereof, as compared to a case according to the embodiment of the present invention in which the continuities of the internal electrodes 20 in the region ② in an upper portion in the thickness direction and an intermediate portion in the width direction, the region ⑧ in a lower portion in the thickness direction and an intermediate portion in the width direction, or the region ② in an upper portion in the thickness direction and an intermediate portion in the width direction and the region ⑧ in a lower portion in the thickness direction and an intermediate portion in the width direction are greater than that of the internal electrodes 20 in the region ⑤ in an intermediate portion in the thickness direction and an intermediate portion in the width direction.

According to the embodiment of the present invention, the continuities of the internal electrodes 20 in the region ② in an upper portion in the thickness direction and an intermediate portion in the width direction, the region ⑧ in a lower portion in the thickness direction and an intermediate portion in the width direction, or the region ② in an upper portion in the thickness direction and an intermediate portion in the width direction and the region ⑧ in a lower portion in the thickness direction and an intermediate portion in the width direction, in the active region 60 on the W-T cross section, may be 85% or more.

In addition, in the regions ①, ③, ④, ⑤, ⑥, ⑦, and ⑨ of the active region 60, except for the region ② in an upper portion in the thickness direction and an intermediate portion in the width direction and the region ⑧ in a lower portion in the thickness direction and an intermediate portion in the width direction, the continuity of the internal electrodes 20 in the region ⑤ in an intermediate portion in the thickness direction and an intermediate portion in the width direction of the active region 60 may be lowest.

Here, the continuity of the internal electrodes 20 in the region ⑤ in an intermediate portion in the thickness direction and an intermediate portion in the width direction of the active region 60 may be 80% or more.

When the continuity of the internal electrodes 20 in the region ⑤ in an intermediate portion in the thickness direction and an intermediate portion in the width direction of the active region 60 is less than 80%, an electrode lumping phenomenon is increased in portions except to the region ⑤, such that capacitance may be reduced.

Meanwhile, according to the embodiment of the present invention, the continuities of the internal electrodes 20 in regions ①, ③, ④, ⑥, ⑦, and ⑨, except for the region ② in an upper portion in the thickness direction and an intermediate portion in the width direction, the region ⑧ in a lower portion in the thickness direction and an intermediate portion in the width direction, and the region ⑤ in an intermediate portion in the thickness direction and an intermediate portion in the width direction in the active region 60 on the W-T cross section, may be smaller than that of the internal electrodes 20 in the region ② in an upper portion in the thickness direction and an intermediate portion in the width direction or the region ⑧ in a lower portion in the thickness direction and an intermediate portion in the width direction and may be greater than that of the internal electrodes 20 in the region ⑤ in an intermediate portion in the thickness direction and an intermediate portion in the width direction. That is, in the active region, the continuity of the internal electrodes 20 in the region ⑤ in an intermediate portion in the thickness direction and an intermediate portion in the width direction may be lowest.

In this case, even when the multilayered ceramic capacitor 10 is fired and then mounted on a substrate to have thermal impact applied thereto or to be bent, a small amount of stress is applied to an inner portion of the multilayered ceramic capacitor 10, such that reliability of the multilayered ceramic capacitor 10 may be further improved.

In addition, according to another embodiment of the present invention, an absolute value difference between the continuity of the internal electrodes 20 in the region ⑤ in an upper portion in the thickness direction and an intermediate portion in the width direction or the region ⑧ in a lower portion in the thickness direction and an intermediate portion in the width direction and the continuity of the internal electrodes 20 in the region ⑧ in an intermediate portion in the thickness direction and an intermediate portion in the width direction may be 3% or more.

When the absolute value difference is 3% or more, internal stress applied to the entire chip may be reduced. In a case in which the absolute value difference is 3% or less, the internal stress applied to the entire chip is high, such that even in a case in which interface cracks were not generated after firing, the possibility of generating interface cracks may be high. Therefore, the possibility that a lifespan of the multilayered ceramic capacitor will be reduced may be high.

In addition, according to the embodiment of the present invention, a ratio (Aa/At) of an area Aa of the active region 60 to the entire area At of the W-T cross section may be 65% to 90%.

In a case in which the ratio (Aa/At) of the area Aa of the active region 60 to the entire area At of the W-T cross section is 90% or more, a ratio of the margin portion is small, such that a side crack may be generated and an average lifespan of the chip may be reduced. In addition, in a case in which sealing is not complete even after the external electrodes are applied and plating is performed, a problem related to moisture proofing may be generated.

Meanwhile, in a case in which the ratio (Aa/At) of the area Aa of the active region 60 to the entire area At of the W-T cross section is 65% or less, an effective electrode area of the active region 60 is insufficient, such that it may be difficult to implement target capacitance.

Experimental Example

The following Table 1 shows results of an experiment recognizing correlations between continuity of internal electrodes according to each position of an active region in a width-thickness (W-T) cross section of each ceramic body of multilayered ceramic capacitors having various chip sizes and whether or not an interface crack is generated. The multilayered ceramic capacitors having various chip sizes used in the experiment of Table 1 have an amount of multilayered internal electrodes of 200 to 500 in order to implement high capacitance, and were selected from among multilayered ceramic capacitors in which formation density of internal electrodes formed in the active region is relatively high.

As described with reference to FIGS. 4 through 6, with respect to the multilayered ceramic capacitors having various chip sizes, an active region in the W-T cross section of each ceramic body were divided into nine regions, ①, ②, ③, ④, ⑤, ⑥, ⑦, ⑧, and ⑨, by being trisected in each of a width direction W and a thickness direction T of the ceramic body and continuities of the internal electrodes in each region were measured. Since a method of measuring the continuity of the internal electrodes in each region has been described above, repeated descriptions will be omitted.

Samples used in the experiment of Table 1 are Comparative Examples compared with Invention Example and were, particularly, manufactured such that continuities of internal electrodes in nine regions, ①, ②, ③, ④, ⑤, ⑥, ⑦, ⑧, and ⑨, are almost similar. Here, the chips having at least two hundred multilayered internal electrodes so as to have high formation density of the internal electrodes were selected for each size.

Whether or not the interface crack is generated was observed using an image captured by scanning any region in the W-T cross section taken at a central portion of the ceramic body in a length direction L by a scanning electron microscope (SEM).

In a high temperature accelerated lifespan experiment, a time spent to reduce insulation resistance to $10^5 \Omega$ or less by applying a direct current (DC) voltage of 20V at a temperature of 135° C. was measured.

TABLE 1

| Sample No. | Standard Chip Size | Continuity in Region ① or (%) | Continuity in Region (%) | Interface Crack Generation | High Temperature Acceleration Lifespan (hr) |
|---|---|---|---|---|---|
| 101* | 3216 | 88.7 | 88.9 | N | 103 |
| 102* | 2012 | 85.4 | 85.5 | N | 98 |
| 103* | 1608 | 83.5 | 83.3 | N | 95 |
| 104* | 1005 | 85.3 | 85.5 | N | 101 |
| 105* | 0603 | 84.2 | 84.5 | Y | 32 |
| 106* | 0402 | 84.7 | 84.9 | Y | 17 |

*Comparative Example

It can be appreciated from Table 1 that in the 1005-size chip, even in the case in which the continuity of the internal electrodes in the region ② in an upper portion in the thickness direction and an intermediate portion in the width direction or the region ⑧ in a lower portion in the thickness direction and an intermediate portion in the width direction is almost similar to that of the internal electrodes in the region ② in an intermediate portion in the thickness direction and an intermediate portion in the width direction (that is, even in the case in which a feature of the present invention is not applied), the interface crack was not generated. The reason for this is that since the formation density of the internal electrodes in the active region is relatively small in the chip having a large size, an influence of the continuity of the internal electrodes on internal stress is not large.

However, it could be appreciated that in the general 0603-size or smaller chip, in the case in which the continuity of the internal electrodes in the region ② in an upper portion in the thickness direction and an intermediate portion in the width direction or the region ⑧ in a lower portion in the thickness direction and an intermediate portion in the width direction is almost similar to that of the internal electrodes in the region ⑤ in an intermediate portion in the thickness direction and an intermediate portion in the width direction, the interface crack was generated. That is, since an area of the active region is increased and the formation density of the internal electrodes in the active region is significantly increased in order to implement high capacitance simultaneously with reducing a chip size, internal stress is increased, and an interface crack is generated.

Therefore, there is a need to alleviate the internal stress by applying the present invention to the 0603-size or smaller chip.

Hereinafter, the Inventive Example will be described in detail with reference to experimental data of Inventive Example and Comparative Examples.

Multilayered ceramic capacitors according to the Inventive Example and the Comparative Examples were manufactured as follows. Slurry containing powder such as barium titanate (BaTiO), or the like, was applied to and dried on a carrier film to prepare a plurality of ceramic green sheets having a thickness of 3.9 μm.

Next, a conductive paste for an internal nickel electrode was applied to the respective ceramic green sheet using screen printing so that internal electrode patterns are formed on the respective ceramic green sheets, thereby forming the internal electrodes.

Here, in order to allow continuities of the internal electrodes on the respective ceramic green sheets to be different, the internal electrodes formed at a central portion of the chip may be extended as compared to internal electrodes formed at upper and lower portions of the chip by laminating the ceramic green sheets on which the internal electrodes are formed and increasing lamination pressure in a central portion of the printed internal electrodes or pressing the central portion thereof two or more times. That is, the internal electrodes at the central portion of the chip may be slimmer in a green chip state before firing.

Here, 250 ceramic green sheets were laminated and this ceramic laminate was isostatically pressed at a pressure of 1000 kgf/cm² at a temperature of 85° C. The ceramic laminate of which pressing is completed was cut into individual chips and the cut chips were de-bound by being maintained at a temperature of 230° C. and in an air atmosphere for 60 hours.

Then, the chips were fired at a temperature of 1150° C. or less under a reduction atmosphere having an oxygen partial pressure of $10^{-11}$ atm to $10^{-10}$ atm lower than an oxygen partial pressure in a state in which Ni/NiO are balanced so that the internal electrodes are not oxidized. Multilayered ceramic capacitors in which continuities of the internal electrodes are changed were manufactured while a firing condition was changed. At this time, sizes of the chips after firing were 0.6±0.15 mm×0.3±0.15 mm×0.3±0.15 mm (L×W×T), that is, 0603-size chips.

Next, processes such as a process of applying external electrodes, a plating process, and the like, were performed to manufacture the multilayered ceramic capacitor.

Here, samples of the multilayered ceramic capacitors were manufactured such that the continuities of the internal electrodes in a cross section taken in width and thickness (W-T) directions were varied.

As described with reference to FIGS. 5 and 6, the continuities of the internal electrodes in nine regions, ①, ②, ③, ④, ⑤, ⑥, ⑦, ⑧, and ⑨, were measure by photographing five images for each of the nine regions, ①, ②, ③, ④, ⑧, ⑥, ⑦, ⑧, and ⑨, as a high magnification image using an optical microscope in the W-T cross section obtained by polishing up to the central portion of the ceramic body and analyzing the photographed high magnification image using a computer program such as SigmaScan Pro, or the like.

The continuities of the internal electrodes in the specific region were measured by calculating an average of the continuities of the internal electrodes analyzed from the five images measured for each of the specific regions ①, ②, ③, ④, ⑤, ⑥, ⑦, ⑧, and ⑨, as described above.

Table 2 shows a ratio (Aa/At) of an area Aa of the active region to the entire area At of the W-T cross section, whether or not an interface crack is generated according to the continuity of the internal electrodes in the W-T cross section of the ceramic body, a high temperature accelerated lifespan, and a ratio of measured capacitance to target capacitance.

At the time of measurement of capacitance, average capacitance of 100 chips was measured in conditions of 1 kHz and 0.5V with respect to target capacitance of 2.2 µF. In addition, it was judged that capacitance was significantly good in the case in which a ratio of the average capacitance to the target capacitance of 2.2 µF was 90% or more and that capacitance was good in the case in which a ratio of the average capacitance to the target capacitance is 85% or more.

In a high temperature accelerated lifespan experiment, a time spent to reduce insulation resistance to $10^5 \Omega$ or less by applying direct current (DC) voltage of 20V at a temperature of 135° C. was measured. It was judged that the high temperature accelerated lifespan is good in the case of 80 hours or more and that the high temperature accelerated lifespan is significantly good in the case of 90 hours or more. In addition, it was judged that the high temperature accelerated lifespan is no good (NG) in the case of less than 30 hours.

Whether or not an interface crack was generated in a central portion of the chip was analyzed, and a minute crack was analyzed through focused ion beam (FIB) processing.

TABLE 2

| Sample No. | Aa/At | Continuity in ① or ⑨ (%) | Continuity in ②,④,⑥ or ⑧ (%) | Continuity in ③ or ⑦ (%) | Continuity in ⑤ (%) | Continuity in ① or − Continuity in ⑤ (%) | Interface Crack Generation | High Temperature Accelerated Lifespan (hr) | Ratio of Measured Capacitance to Target Capacitance (%) |
|---|---|---|---|---|---|---|---|---|---|
| 201* | 66.1 | 77.7 | 82.4 | 82.7 | 81.5 | 3.8 | Y | NG | 72.7 |
| 202* | 70.2 | 80.3 | 80.3 | 80.4 | 80.5 | 0.2 | Y | NG | 74.5 |
| 203* | 69.5 | 83.4 | 83.1 | 83.6 | 84.5 | 0.9 | Y | NG | 76.9 |
| 204* | 69.9 | 84.2 | 84.5 | 86.7 | 86.6 | 2.2 | Y | NG | 75.4 |
| 205* | 60.2 | 83.6 | 83.2 | 83.1 | 79.3 | 4.3 | N | 97 | 79.8 |
| 206* | 63.3 | 88.9 | 86.5 | 86.3 | 86.1 | 2.7 | N | 81 | 80.3 |
| 207* | 64.5 | 84.1 | 80.4 | 80.1 | 79.9 | 4.2 | N | 96 | 82.5 |
| 208 | 65.2 | 85.2 | 80.2 | 80.2 | 78.8 | 6.4 | N | 85 | 90.4 |
| 209 | 65.5 | 85.1 | 80.4 | 80.3 | 80.2 | 4.9 | N | 94 | 91.2 |
| 210 | 67.8 | 84.7 | 84.3 | 84.2 | 81.9 | 2.8 | N | 82 | 87.3 |
| 211 | 71.4 | 95.3 | 88.8 | 88.3 | 85.1 | 10.2 | N | 101 | 92.1 |
| 212 | 78.8 | 91.4 | 88.9 | 88.8 | 88.5 | 2.9 | N | 81 | 91.5 |
| 213 | 82.5 | 90.4 | 86.2 | 85.9 | 80.5 | 9.9 | N | 105 | 92.1 |
| 214 | 83.3 | 89.2 | 81.2 | 81.1 | 79.5 | 9.7 | N | 97 | 86.6 |
| 215 | 84.4 | 84.8 | 81.9 | 81.9 | 80.1 | 3.7 | N | 92 | 86.3 |
| 216 | 87.7 | 85.2 | 83.2 | 83.1 | 82 | 3.2 | N | 89 | 93.5 |
| 217 | 88.9 | 89.7 | 81.2 | 81.5 | 82.3 | 7.4 | N | 84 | 85.4 |
| 218 | 89.3 | 95.2 | 87.7 | 87.4 | 85.2 | 10 | N | 103 | 101.3 |
| 219 | 89.7 | 92.3 | 83.3 | 82.9 | 80.5 | 11.8 | N | 98 | 95.2 |
| 220* | 90.3 | 88.1 | 80.2 | 80.1 | 77.2 | 10.9 | N | NG | 94.1 |
| 221* | 92.1 | 93.3 | 85 | 84.8 | 84.1 | 9.2 | N | NG | 103.8 |
| 222* | 92.5 | 95.2 | 79.3 | 79.3 | 78.5 | 6.7 | N | NG | 104.2 |

TABLE 2-continued

| Sample No. | Aa/At | Continuity in ,,,, or (%) | Continuity in,,,, or (%) | Continuity in or (%) | Continuity in (%) | Continuity in or – Continuity in ǀ (%) | Interface Crack Generation | High Temperature Accelerated Lifespan (hr) | Ratio of Measured Capacitance to Target Capacitance (%) |
|---|---|---|---|---|---|---|---|---|---|
| 223* | 93.2 | 84.4 | 78.7 | 78.5 | 75 | 9.4 | N | NG | 97.5 |
| 224* | 93.4 | 86.4 | 79.9 | 79.6 | 80.3 | 6.1 | N | NG | 99.8 |

*Comparative Example

Referring to Table 2, sample numbers 201 to 207 and 220 to 224 are Comparative Examples and sample numbers 208 to 219 are Inventive Examples.

Based on the W-T cross section taken in the width and thickness (W-T) directions, sample numbers 208 to 219 corresponding to Inventive Examples are samples in which the continuity of the internal electrodes in the region ② in an upper portion in the thickness direction and an intermediate portion in the width direction or the region ⑧ in a lower portion in the thickness direction and an intermediate portion in the width direction is greater than that of the internal electrodes in the region ⑤ in an intermediate portion in the thickness direction and an intermediate portion in the width direction.

It could be appreciated that an interface crack was not generated in sample numbers 208 to 219 corresponding to Inventive Examples. In addition, the high temperature accelerated lifespan is 80 hours or more, which is good. Further, it could be appreciated that a ratio of average capacitance to target capacitance is 85% or more (good) or 90% or more (significantly good).

It could be appreciated that based on the W-T cross section taken in the width-thickness (W-T) directions, in the case in which the continuities of the internal electrodes in the nine regions, ①, ②, ③, ④, ⑤, ⑥, ⑦, ⑧, and ⑨, are almost uniform (sample number 202) or in the case in which the continuity of the internal electrodes in the region ② in an upper portion in the thickness direction and an intermediate portion in the width direction or the region ⑧ in a lower portion in the thickness direction and an intermediate portion in the width direction is smaller than that of the internal electrodes in the region ⑤ in an intermediate portion in the thickness direction and an intermediate portion in the width direction (sample numbers 201 to 204), the capacitance was low, the high temperature accelerated lifespan was short, and the interface crack was generated.

In the case of Comparative Examples (sample numbers 205 to 207) in which the ratio (hereinafter, referred to as Aa/At) of an area Aa of the active region to the entire area At of the W-T cross section is almost 65% or less, the ratio of capacitance to target capacitance is no good. The reason is that the area Aa of the active region forming the capacitance is insufficient.

Further, it could be appreciated that in the case of Comparative Examples (sample numbers 220 to 224) in which t Aa/At exceeds 90%, even though the interface crack is not generated, the high temperature accelerated lifespan is less than 30 hours, which is no good (NG). This is because that an area of the margin portion may be narrow or the internal stress may not be appropriately alleviated.

It could be appreciated that among Inventive Examples, in the case of sample numbers 210 and 215 in which the continuity of the internal electrodes in the region ② in an upper portion in the thickness direction and an intermediate portion in the width direction or the region ⑧ in a lower portion in the thickness direction and an intermediate portion in the width direction is less than 85%, even though the ratio of capacitance to target capacitance is 85% or more to below 90%, which is good, a capacitance value is relatively low.

In addition, it could be appreciated that in the case of sample number 214 in which the continuity of the internal electrodes in the region ⑤ in an intermediate portion in the thickness direction and an intermediate portion in the width direction is less than 80% among Inventive Examples, even though the ratio of capacitance to target capacitance is 85% or more to below 90%, which is good, a capacitance value is relatively low.

Meanwhile, it could be appreciated that in the case of sample number 217 in which the continuity of the internal electrodes in the region ⑤ in an intermediate portion in the thickness direction and an intermediate portion in the width direction is higher than those of the internal electrodes in the regions ①, ③, ④, ⑥, ⑦, and ⑨, among Inventive Examples, even though the ratio of capacitance to target capacitance is 85% or more to below 90%, which is good, a capacitance value is relatively low. In addition, it could be appreciated that in the case of sample number 217, even though the high temperature accelerated lifespan is 80 hours or more to below 90 hours, which is good, the high temperature accelerated lifespan is relatively shorter that those of other samples.

Further, it could be appreciated that among Inventive Examples, in the case of sample numbers 210 and 212 in which an absolute value difference (ǀ the continuity in the region ⑤—the continuity in the region ② or ⑧ǀ) between the continuity of the internal electrodes in the region ② in an upper portion in the thickness direction and an intermediate portion in the width direction or the region ⑧ in a lower portion in the thickness direction and an intermediate portion in the width direction and the continuity of the internal electrodes in the region ⑤ in an intermediate portion in the thickness direction and an intermediate portion in the width direction is less than 3%, the high temperature accelerated lifespan is 80 hours or more to below 90 hours, which is good; however, the ratio of capacitance to target capacitance is relatively lower than those of other samples.

Although the 0603-size samples were used in the experiment of Table 2 according to the embodiment of the present invention, the scope of the present invention is not limited to a 0603-size chip, but may also be applied to a chip smaller than the 0603-size chip.

In other words, since the formation density of the internal electrodes in the active region is increased in order to implement miniaturization and an increase in capacitance even in the case of a 0402-size or smaller chip, similar to the 0603-size chip, internal stress is increased. It may be easily appreciated by those skilled in the art that the concept of the present invention may be applied to the 0402-size chip or the 0402-size or smaller chip in order to alleviate internal stress therein.

As set forth above, in the multilayered ceramic electronic component according to the embodiments of the present invention, the generation of internal defects such as cracks at the interface between the dielectric layers and the internal electrode layers can be reduced by alleviating internal stress, even in the case in which the multilayered ceramic electronic component is miniaturized and capacitance thereof is increased.

In addition, with the multilayered ceramic electronic component according to the embodiments of the present invention, a reliable multilayered ceramic electronic component that does not have internal defects while having improved characteristics can be provided.

While the present invention has been shown and described in connection with the embodiments, it will be apparent to those skilled in the art that modifications and variations can be made without departing from the spirit and scope of the invention as defined by the appended claims.

What is claimed is:

1. A multilayered ceramic electronic component having a 0603 size or less, the multilayered ceramic electronic component comprising:
    a ceramic body including a plurality of internal electrodes and dielectric layers disposed between the internal electrodes; and
    external electrodes disposed on outer surfaces of the ceramic body and electrically connected to the internal electrodes,
    wherein when a region in which the internal electrodes are overlapped is defined as an active region in a cross section of a central portion in a length direction of the ceramic body, taken in width and thickness directions thereof, the entire area of the cross section taken in the width and thickness directions is defined as At, and an area of the active region is defined as Aa, the following equation is satisfied: $65\% \leq Aa/At \leq 90\%$, and
    when the active region is divided into nine regions, ①, ②, ③, ④, ⑤, ⑥, ⑦, ⑧, and ⑨, by being trisected in each of the width and thickness directions, continuity of the internal electrodes in region ② in an upper portion in the thickness direction and an intermediate portion in the width direction or continuity of the internal electrodes in region ⑧ in a lower portion in the thickness direction and an intermediate portion in the width direction is greater than those of the internal electrodes in regions, except for the region ② in the upper portion in the thickness direction and the intermediate portion in the width direction and the region ⑧ in the lower portion in the thickness direction and the intermediate portion in the width direction.

2. The multilayered ceramic electronic component of claim 1, wherein the continuity of the internal electrodes in the region ② in the upper portion in the thickness direction and the intermediate portion in the width direction or the continuity of the internal electrodes in the region ⑧ in the lower portion in the thickness direction and the intermediate portion in the width direction is 85% or more.

3. The multilayered ceramic electronic component of claim 1, wherein the continuities of the internal electrodes in the region ② in the upper portion in the thickness direction and the intermediate portion in the width direction and the region ⑧ in the lower portion in the thickness direction and the intermediate portion in the width direction are greater than those of the internal electrodes in the regions ①, ③, ④, ⑤, ⑥, ⑦, and ⑨, except for the region in the upper portion in the thickness direction and the intermediate portion in the width direction and the region in the lower portion in the thickness direction and the intermediate portion in the width direction.

4. The multilayered ceramic electronic component of claim 1, wherein in the active region, continuity of the internal electrodes in region ⑤ in an intermediate portion in the thickness direction and an intermediate portion in the width direction is lowest.

5. The multilayered ceramic electronic component of claim 4, wherein the continuity of the internal electrodes in the region ⑤ in the intermediate portion in the thickness direction and the intermediate portion in the width direction is 80% or more.

6. The multilayered ceramic electronic component of claim 1, wherein an absolute value difference between the continuity of the internal electrodes in the region ② in the upper portion in the thickness direction and the intermediate portion in the width direction or the continuity of the internal electrodes in the region ⑧ in the lower portion in the thickness direction and the intermediate portion in the width direction and the continuity of the internal electrodes in region ⑤ in an intermediate portion in the thickness direction and an intermediate portion in the width direction is 3% or more.

7. The multilayered ceramic electronic component of claim 1, wherein a margin portion of the taken cross section has a width of 50 μm or less.

8. The multilayered ceramic electronic component of claim 1, wherein the internal electrodes are laminated in an amount of 200 layers or more.

9. The multilayered ceramic electronic component of claim 1, wherein a length, a width, and a thickness of the ceramic body have ranges of 0.6±0.15 mm, 0.3±0.15 mm, and 0.3±0.15 mm, respectively, or have ranges of 0.4±0.10 mm, 0.2±0.10 mm, and 0.2±0.10 mm, respectively.

10. A multilayered ceramic electronic component comprising:
    a ceramic body including a dielectric layer and internal electrodes;
    an active region having the internal electrodes overlapped in a cross section taken in width and thickness directions of the ceramic body to contribute to a formation of capacitance; and
    a margin portion defining an outer portion of the active region,
    wherein when the active region is divided into nine regions, ①, ②, ③, ④, ⑤, ⑥, ⑦, ⑧, and ⑨, by being trisected in each of the width and thickness directions, continuity of the internal electrodes in region ② in the upper portion in the thickness direction and the intermediate portion in the width direction or continuity of the internal electrodes in region ⑧ in the lower portion in the thickness direction and the intermediate portion in the width direction is greater than those of the internal electrodes in regions, except for the region ② in the upper portion in the thickness direction and the intermediate portion in the width direction and the region ⑧ in the lower portion in the thickness direction and the intermediate portion in the width direction.

11. The multilayered ceramic electronic component of claim 10, wherein the continuity of the internal electrodes in the region ② in the upper portion in the thickness direction and the intermediate portion in the width direction or the continuity of the internal electrodes in the region ⑧ in the lower portion in the thickness direction and the intermediate portion in the width direction is 85% or more.

12. The multilayered ceramic electronic component of claim 10, in the active region, continuity of the internal electrodes in region ⑤ in an intermediate portion in the thickness direction and an intermediate portion in the width direction is lowest.

13. The multilayered ceramic electronic component of claim 12, wherein the continuity of the internal electrodes in the region ⑤ in the intermediate portion in the thickness direction and the intermediate portion in the width direction is 80% or more.

14. The multilayered ceramic electronic component of claim 10, wherein an absolute value difference between the continuity of the internal electrodes in the region ② in the upper portion in the thickness direction and the intermediate portion in the width direction or the continuity of the internal electrodes in the region ⑧ in the lower portion in the thickness direction and the intermediate portion in the width direction and the continuity of the internal electrodes in region ⑤ in an intermediate portion in the thickness direction and an intermediate portion in the width direction is 3% or more.

15. The multilayered ceramic electronic component of claim 10, wherein a ratio of the active region to the entire area of the taken cross section is 65 to 90%, and the multilayered ceramic electronic component is a 0603-size or smaller multilayered ceramic electronic component.

16. The multilayered ceramic electronic component of claim 10, wherein the margin portion has a width of 50 μm or less.

17. The multilayered ceramic electronic component of claim 10, wherein a length, a width, and a thickness of the ceramic body have ranges of 0.6±0.15 mm, 0.3±0.15 mm, and 0.3±0.15 mm, respectively, or have ranges of 0.4±0.10 mm, 0.2±0.10 mm, and 0.2±0.10 mm, respectively.

18. The multilayered ceramic electronic component of claim 10, wherein the internal electrodes are laminated in an amount of 200 layers or more.

19. A multilayered ceramic electronic component having a 0603 size or less, the multilayered ceramic electronic component comprising:
a ceramic body including a plurality of internal electrodes and dielectric layers disposed between the internal electrodes; and
external electrodes disposed on outer surfaces of the ceramic body and electrically connected to the internal electrodes,
wherein when a region in which the internal electrodes are overlapped is defined as an active region in a cross section of a central portion in a length direction of the ceramic body, taken in width and thickness directions thereof, the entire area of the cross section taken in the width and thickness directions is defined as At, and an area of the active region is defined as Aa, the following equation is satisfied: 65%≤Aa/At≤90%, and
when the active region is divided into nine regions, ①, ②, ③, ④, ⑤, ⑥, ⑦, ⑧, and ⑨, by being trisected in each of the width and thickness directions, continuity of the internal electrodes in region ② in an upper portion in the thickness direction and an intermediate portion in the width direction or continuity of the internal electrodes in region ⑧ in a lower portion in the thickness direction and an intermediate portion in the width direction is greater than that of the internal electrodes in region ⑤ in an intermediate portion in the thickness direction and an intermediate portion in the width direction.

20. The multilayered ceramic electronic component of claim 19, wherein the continuity of the internal electrodes in the region ② in the upper portion in the thickness direction and the intermediate portion in the width direction or the continuity of the internal electrodes in the region ⑧ in the lower portion in the thickness direction and the intermediate portion in the width direction is 85% or more.

21. The multilayered ceramic electronic component of claim 19, wherein the continuity of the internal electrodes in the region ⑤ in the intermediate portion in the thickness direction and the intermediate portion in the width direction is 80% or more.

22. The multilayered ceramic electronic component of claim 19, wherein the continuities of the internal electrodes in the region ② in the upper portion in the thickness direction and an intermediate portion in the width direction and the region ⑧ in the lower portion in the thickness direction and an intermediate portion in the width direction are greater than that of the internal electrodes in the region ⑤ in the intermediate portion in the thickness direction and the intermediate portion in the width direction.

23. The multilayered ceramic electronic component of claim 19, wherein an absolute value difference between the continuity of the internal electrodes in the region ② in the upper portion in the thickness direction and the intermediate portion in the width direction or the continuity of the internal electrodes in the region ⑧ in the lower portion in the thickness direction and the intermediate portion in the width direction and the continuity of the internal electrodes in the region ⑤ in the intermediate portion in the thickness direction and the intermediate portion in the width direction is 3% or more.

24. The multilayered ceramic electronic component of claim 19, wherein the continuity of the internal electrodes in the region ② in the upper portion in the thickness direction and the intermediate portion in the width direction or the region ⑧ in the lower portion in the thickness direction and the intermediate portion in the width direction is greater than those of the internal electrodes in regions ①, ③, ④, ⑥, ⑦, and ⑨, except for the region ② in the upper portion in the thickness direction and the intermediate portion in the width direction, the region ⑧ in the lower portion in the thickness direction and the intermediate portion in the width direction, and the region ⑤ in the intermediate portion in the thickness direction and the intermediate portion in the width direction.

25. The multilayered ceramic electronic component of claim 19, wherein continuities of the internal electrodes in regions ①, ③, ④, ⑥, ⑦, and ⑨, except for the region ② in the upper portion in the thickness direction and the intermediate portion in the width direction, the region ⑧ in the lower portion in the thickness direction and the intermediate portion in the width direction, and the region ⑤ in the intermediate portion in the thickness direction and the intermediate portion in the width direction, are greater than that of the internal electrodes in the region ⑤ in the intermediate portion in the thickness direction and the intermediate portion in the width direction.

26. The multilayered ceramic electronic component of claim 19, wherein in the active region, the continuity of the internal electrodes in the region ⑤ in the intermediate portion in the thickness direction and the intermediate portion in the width direction is lowest.

27. The multilayered ceramic electronic component of claim 19, wherein a margin portion of the taken cross section has a width of 50 μm or less.

28. The multilayered ceramic electronic component of claim 19, wherein a length, a width, and a thickness of the ceramic body have ranges of 0.6±0.15 mm, 0.3±0.15 mm, and 0.3±0.15 mm, respectively, or have ranges of 0.4±0.10 mm, 0.2±0.10 mm, and 0.2±0.10 mm, respectively.

29. The multilayered ceramic electronic component of claim 19, wherein the internal electrodes are laminated in an amount of 200 layers or more.

* * * * *